United States Patent [19]

Ogata et al.

[11] Patent Number: 4,744,972
[45] Date of Patent: May 17, 1988

[54] METHOD FOR PRODUCTION OF HIGHLY DIELECTRIC POWDER

[75] Inventors: Yasuyuki Ogata; Hidetsugu Ono, both of Saitama, Japan

[73] Assignee: Mitsubishi Mining and Cement Co. Ltd., Tokyo, Japan

[21] Appl. No.: 900,556

[22] Filed: Aug. 26, 1986

[30] Foreign Application Priority Data

Nov. 25, 1985 [JP] Japan .................. 60-264420

[51] Int. Cl.$^4$ ............... C04B 35/46; C01G 23/053
[52] U.S. Cl. ..................... 423/598; 423/606; 423/619; 423/635; 501/134; 501/135; 501/136; 252/62.9
[58] Field of Search ............. 501/134, 135, 136, 138, 501/139; 423/598, 58, 71, 85, 619, 635, 606; 252/62.9

[56] References Cited

U.S. PATENT DOCUMENTS

| | | | |
|---|---|---|---|
| 3,699,044 | 10/1972 | Dosch et al. | 423/598 X |
| 4,048,546 | 9/1977 | Bouchard et al. | 501/136 X |
| 4,063,341 | 12/1977 | Bouchard et al. | 501/136 X |
| 4,543,341 | 9/1985 | Barringer et al. | 501/134 X |
| 4,582,814 | 4/1986 | Thomas | 501/136 OR |

FOREIGN PATENT DOCUMENTS

0086022  5/1985  Japan ..................... 423/598

Primary Examiner—William R. Dixon, Jr.
Assistant Examiner—Karl Group
Attorney, Agent, or Firm—Frank J. Jordan; C. Bruce Hamburg; Manabu Kanesaka

[57] ABSTRACT

A highly dielectric powder the chemical composition of which is represented by the following general formula:

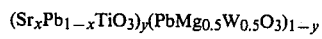

$(Sr_xPb_{1-x}TiO_3)_y(PbMg_{0.5}W_{0.5}O_3)_{1-y}$ (wherein $0 \leq x < 1$ and $0 < y < 1$) is produced by a method which comprises adding a mixture consisting of strontium alkoxide (which is not required when the subscript, x, in the aforementioned general formula is 0), lead alkoxide, titanium alkoxide, and magnesium alkoxide to an aqueous solution of ammonium para-tungstate thereby effecting hydrolysis of alkoxides and coprecipitation of a tungsten component and subsequently heating the resultant precipitate.

16 Claims, No Drawings

METHOD FOR PRODUCTION OF HIGHLY DIELECTRIC POWDER

FIELD OF THE INVENTION AND RELATED ART STATEMENT

This invention relates to a method for the production of a highly dielectric powder, and more particularly to a method for the production of a highly dielectric powder represented by the following general formula (I):

$$(Sr_xPb_{1-x}TiO_3)_y(PbMg_{0.5}W_{0.5}O_3)_{1-y} \quad (I)$$

(wherein $0 \leq x < 1$ and $0 < y < 1$), having a low sintering temperature and consisting of highly pure, uniform, and fine particles and proving useful as a material for ceramic condensers.

In recent years, the need for ceramic condensers of more decreased size and more increased accuracy has been raised. As a natural consequence, the raw material powder for the ceramic condensers is urgently required to possess high homogeneity and purity of composition and high fineness of powder.

As a highly dielectric material capable of being sintered at a low temperature below 1,000° C. and suitable for ceramic condensers, a material represented by the following general formula (II):

$$(Sr_xPb_{1-x}TiO_3)_a(PbMg_{0.5}W_{0.5}O_3)_b \quad (II)$$

(wherein $x=0$ to 0.10, $a=0.35$ to 0.5, $b=0.5$ to 0.65, and $a+b=1$) has been disclosed by Robert Joseph Bochard under a title "Monolithic condenser and method for production thereof" in Japanese Patent Application Laid-open SHO No. 52(1977)-21,662 and under a title "Dielectric powder composition" in Japanese Patent Application Laid-open SHO No. 52(1977)-21,699.

In the publications mentioned above, however, the highly dielectric powder represented by the aforementioned general formula (II) is described as being produced by using metal oxides and metal carbonates of the component elements as starting materials and mixing and comminuting these raw materials in a mortar or a ball mill. Thus, this dielectric powder has a problem that it is not produced in a high purity because it possibly suffers inclusion therein of impurities during the course of mixing and comminution. Moreover, when the raw materials are mixed and comminuted as with a ball mill, there is a problem that since the thoroughness of the mixing and comminuting action has its limit, it is not possible to produce a mixed powder of high fineness and it is extremely difficult to uniformize the particle diameter and the composition of the mixed powder.

OBJECT AND SUMMARY OF THE INVENTION

An object of this invention is to eliminate the problems suffered by the prior art as described above and provide a method for producing a highly dielectric material represented by the aforementioned general formula (I) and embracing the dielectric powder represented by the aforementioned general formula (II), in the form of powder, and satisfying the requirements:
(1) high purity,
(2) thorough homogeneity of composition, and
(3) extreme fineness of powder.

Another object of this invention is to promote enhancement of the characteristics as a dielectric of the dielectric material represented by the aforementioned general formula (I) and improvement of the low-temperature sintering property of the dielectric material.

These objects are accomplished by a method for the production of a highly dielectric powder, the chemical composition of which is represented by the general formula (I):

$$(Sr_xPb_{1-x}TiO_3)_y(PbMg_{0.5}W_{0.5}O_3)_{1-y} \quad (I)$$

(wherein $0 \leq x < 1$ and $0 < y < 1$), which method is characterized in that the aforementioned highly dielectric powder is obtained by adding a mixture consisting of strontium alkoxide (which is not required when x in the aforementioned formula (I) is 0), lead alkoxide, titanium alkoxide, and magnesium alkoxide to an aqueous solution of ammonium para-tungstate thereby effecting hydrolysis of alkoxides and coprecipitation of tungsten component and subsequently heating the resulting precipitate.

In the foregoing formula (I), the optimum ranges of the values of the subscripts, x and y, for the sake of the dielectric characteristic are respectively $0 \leq x < 0.15$ and $0.3 < y < 0.5$.

DETAILED DESCRIPTION OF PREFERRED EMBODIMENTS

In the present invention, a metal alkoxide mixture is prepared by mixing the alkoxides of the metal elements composing the highly dielectric material represented by the foregoing general formula (I), except for tungsten, namely lead alkoxide, titanium alkoxide, magnesium alkoxide, and optionally strontium alkoxide, in proportions calculated to give the composition of the aforementioned general formula (I).

The term "metal alkoxide" as used in the specification hereof refers to a compound obtained from an alcohol by the replacement of the hydrogen atom in the OH group thereof with a metal atom. The metal alkoxides to be used in the present invention are desired to be prepared as described below.

(a) The strontium alkoxide and magnesium alkoxide are obtained by direct reaction of the corresponding metals with an alcohol in accordance with the following chemical reaction formula (A):

$$M + 2ROH \rightarrow M(OR)_2 + H_2 \uparrow \quad (A)$$

(wherein M stands for Sr or Mg and ROH for an alcohol). Specifically, the strontium alkoxide is obtained by adding strontium as a metal to such an alcohol as methanol, ethanol, or iso-propyl alcohol. The magnesium alkoxide is obtained by the same procedure. In this case, for the alkoxide to be produced in a high purity, it suffices to use strontium or magnesium as the raw material metal in a high purity.

(b) The lead alkoxide can be easily obtained in a high purity by the method disclosed in Japanese Patent Application SHO No. 60(1985)-52,332 formerly filed by the present applicant, namely the method which comprises adding lead acetate in excess of the theoretical amount to a solution of sodium alkoxide in alcohol thereby forming lead alkoxide as indicated by the following chemical reaction formula (B):

$$Pb(CH_3COO)_2 + 2NaOR \rightarrow Pb(OR)_2 + 2CH_3COONa \quad (B)$$

(wherein R stands for an alkyl group), depriving the resulting reaction mixture of the alcohol by distillation, adding an aromatic hydrocarbon solvent such as benzene to the residue of the distillation thereby extracting lead alkoxide, separating the lead alkoxide by filtration, and consequently obtaining an aromatic hydrocarbon solution of lead alkoxide.

(c) The titanium alkoxide can be obtained by any of the conventional methods such as a method which comprises introducing ammonia gas into a solution of titanium chloride in an alcohol thereby producing titanium alkoxide as indicated by the following chemical reaction formula (C):

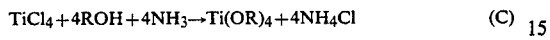  (C)

Even titanium alkoxide of commercial grade has a sufficiently high purity as required herein. Concrete examples of the commercially available titanium alkoxide are titanium propoxide (Ti(OC$_3$H$_7$)$_4$) and titanium butoxide (Ti(OC$_4$H$_9$)$_4$).

For the sake of reactivity, the metal alkoxides produced as described above are desired to be metal alkoxides which consist of the corresponding metals and a monohydric alcohol such as methanol, ethanol, isopropanol, butanol, or amyl alcohol.

The metal alkoxides to be used in the present invention are desired not to contain impurities (especially alkali metals) in a concentration exceeding 0.1 mol %, preferably 0.05 mol %. This is because an alkali metal, if present in a metal alkoxide, reacts with the metal alkoxide to form a composite alkoxide, which possibly impedes formation of a compound aimed at or its precursor. If an alkali metal alkoxide is formed because of the presence of an alkali metal, the hydrolysis thereof possibly entails a disadvantage that the reaction system will be varied toward a higher pH value after the hydrolysis to bring about a change in the composition of the product and impede the expected precipitation of the product.

In this invention, to mix these metal alkoxides, it is desirable to use an organic solvent, dissolve the necessary metal alkoxides in this solvent preferably in a concentration of about 0.1 to 1 mol/liter, and mix them thoroughly by mechanical stirring means such as rotary blades or a chemical stirrer, or stirring means resorting to a refluxing treatment, or combination of the two stirring means mentioned above. As examples of the organic solvent usable in this case, there can be cited benzene, toluene, and xylene and alcohols such as isopropanol, butanol, methanol, ethanol, and n-propyl alcohol. These solvents may be used either singly or in the form of a mixture of two or more mutually compatible members.

By having the metal alkoxide solution thoroughly mixed, the reaction of hydrolysis in the subsequent step is enabled to proceed with very high uniformity.

The temperature at which the metal alkoxides are mixed is only required to be lower than the temperature at which the metal alkoxides being used are thermally decomposed. When this mixing is carried out in an organic solvent, this temperature is desirably between 0° and 100° C., and more desirably between 10° and 70° C.

The mixture of metal alkoxides prepared as described above is then added to an aqueous solution of ammonium para-tungstate (preferably of a concentration of 0.1 to 5% by weight, especially 2 to 4% by weight) in a proportion calculated to yield the product of a desired composition to effect hydrolysis of alkoxides and coprecipitation of a tungsten component.

In the preparation of this aqueous solution of ammonium para-tungstate, though ammonium para-tungstate is soluble in water, it is desired to be dissolved in water of a temperature exceeding 70° C. from the standpoint of solubility. The addition of the mixture of metal alkoxides to the aqueous solution of ammonium para-tungstate can be accomplished, when the mixing of the metal alkoxides has been carried out in an organic solvent, by simply allowing the mixed solution in its unmodified form to drop into the aqueous solution of ammonium para-tungstate. As the result, hydrolysis of the metal alkoxides and coprecipitation of a tungsten component simultaneously ensue to produce a precipitate of amorphous hydrate. In this case, the temperature of the treatment is fixed in the range of 0° to 100° C. for the convenience of handling and the treatment is desired to be carried out with continued stirring. The pressure under which the reaction is carried out is generally atmospheric pressure, though it may be increased up to 250 atmospheres or decreased to not less than 0.1 atmosphere.

The crystalline composition of the aforementioned formula (I) aimed at by this invention is obtained by causing the precipitate produced in consequence of the aforementioned hydrolysis and the coprecipitation of the tungsten component to be separated by filtration, for example, drying the separated precipitate, and heating the dried precipitate. The heating temperature to be used in this case is desired to be not lower than 600° C. and not higher than the decomposition temperature of the produced highly dielectric powder.

The highly dielectric powder obtained by the method of this invention, when observed under an electron microscope after two hours' heat treatment at 700° C., is found to have an extremely uniform particle diameter of about 0.05 to 0.08 μm.

Moreover, the highly dielectric powder thus obtained can be easily converted into a sintered article by being sintered at a lower temperature than the dielectric powder obtained by the conventional method which comprises mixing and comminuting metal oxides or metal carbonate. It, further, possesses excellent electric characteristics for a dielectric, such as a large dielectric constant and a low dielectric loss.

Since the method of this invention comprises adding a mixture of alkoxides of component metal elements other than tungsten to an aqueous solution of ammonium para-tungstate thereby inducing the hydrolysis of the alkoxides and coprecipitation of a tungsten component simultaneously, it can easily produce a highly dielectric powder of high purity, homogeneous composition, and uniform particle size without including impurities therein.

The highly dielectric powder obtained by this invention is a microfine powder of high purity and homogeneous composition. Thus, it can be sintered at a low temperature to produce a sintered article without difficulty and it possesses excellent characteristics for a dielectric. In this invention, the values of the subscripts, x and y, in the aforementioned general formula (I) fall in the ranges of $0 \leq x < 1$ and $0 < y < 1$, preferably $0 \leq x < 0.15$ and $0.3 < y < 0.5$. This is because the composition satisfying this requirement produces a dielectric powder of the highest dielectric constant.

Now, the present invention will be described more specifically below with reference to working examples and comparative experiments. It should be noted, however, that this invention is not limited to these working examples.

In the working examples, the test of a given dielectric powder for electric characteristics was conducted by a procedure which comprised compression molding the powder under pressure of 3000 Kgf/cm$^2$: to produce discs 16 mm in diameter and 1 mm in thickness, sintering these discs in the air at varying temperatures of 950° C., 1,000° C., and 1,050° C. for one hour, fusing silver electrodes one each to the opposite surfaces of the sintered discs, and measuring dielectric constants, dielectric losses, and specific resistances of the discs at 20° C. The dielectric constants and dielectric losses were measured at 1 KHz with a digital LCR meter. The electric resistances were measured with an insulation resistance member after 5 seconds' application of a voltage of 100 V and the specific resistances were calculated from the results of this measurement.

EXAMPLE 1

Synthesis of $(SR_{0.1}PB_{0.9}TiO_3)_{0.5}(PbMg_{0.5}W_{0.5}O_3)_{0.5}$

In 200 ml of iso-propyl alcohol, 4.38 g of elemental Sr of a purity of 99.9% was stirred for reaction with the alcohol at 60° C. for one hour. Separately, 6.08 g of elementary Mg of a high purity and 300 ml of methanol were stirred for reaction at 35° C. for one hour. Consequently, there were synthesized an iso-propyl alcohol solution of strontium iso-propoxide and a methanol solution of magnesium methoxide.

By the method disclosed in Japanese Patent Application SHO No. 60(1985)-52,332, 1000 ml of a benzene solution (0.95 mol/liter) of lead butoxide was synthesized. To be specific, a butanol solution of sodium butoxide was synthesized by adding 50 g of sodium to 1,500 ml of butanol. This solution and 425 g of lead acetate added thereto were left reacting at 60° C. for 7 hours. By filtering the resulting reaction mixture, there was obtained a clear butanol solution of lead butoxide. This solution was distilled to expel butanol by evaporation and the residue of the distillation was admixed with 1,000 ml of benzene. The resulting solution was filtered to expel impurities and obtain a benzene solution of lead butoxide.

A mixed solution of metal alkoxides was prepared by mixing the three alkoxides obtained as described above and 142.1 g of commercially available titanium iso-propoxide at room temperature with a magnetic stirrer.

Separately, 65.27 g of ammonium para-tungstate was dissolved in 1,800 ml of water at 70° C. to prepare an aqueous solution of ammonium para-tungstate. Into this aqueous solution of ammonium para-tungstate, the aforementioned mixed solution of metal alkoxides was added dropwise while under agitation at a rate of 10 ml/min. to produce a precipitate. The precipitate thus obtained was separated by filtration, dried in the air, and heated at 700° C. for two hours, to afford a powder having a composition aimed at.

The powder thus obtained was tested for electric properties. The results are shown in Table 1.

COMPARATIVE EXPERIMENT 1

In a ball mill, the metal oxides, PbO, TiO$_2$, and WO$_3$ and the metal carbonates, SrCO$_3$ and MgCO$_3$ were mixed and comminuted. The resultant mixture was calcined at 700° C. for five hours and then comminuted in a ball mill. Consequently, there was prepared a powder having the same composition as in Example 1.

The powder thus obtained was tested for electric properties. The results are shown in Table 1.

EXAMPLE 2

Synthesis of $(PbTiO_3)_{0.4}(PbMg_{0.5}W_{0.5}O_3)_{0.6}$

A powder having a composition aimed at was obtained by following the procedure of Example 1, except that the mixing ratios of the raw materials were changed.

The powder thus prepared was tested for electric properties. The results are shown in Table 1.

COMPARATIVE EXPERIMENT 2

A powder having the same composition as that of Example 2 was prepared by following the procedure of Comparative Experiment 1, using the metal oxides of PbO, TiO$_2$, and WO$_3$ and a metal carbonate of MgCO$_3$.

The powder thus prepared was tested for electric properties. The results are shown in Table 1.

TABLE 1

| Electric Properties | Firing temperature (°C.) | Example 1 | Comparative Experiment 1 | Example 2 | Comparative Experiment 2 |
|---|---|---|---|---|---|
| Dielectric constant ($\epsilon$) | 950 | 4100 | 2300 | 6500 | 6000 |
|  | 1000 | 5500 | 3400 | 7100 | 6800 |
|  | 1050 | 7300 | 6400 | 8200 | 7100 |
| Dielectric loss (%) | 950 | 2.4 | 3.8 | 1.5 | 3.1 |
|  | 1000 | 1.5 | 3.7 | 0.8 | 1.9 |
|  | 1050 | 0.5 | 2.7 | 0.8 | 2.3 |
| Specific resistance ($\times 10^{12} \Omega \cdot$ cm) | 950 | 6.9 | 7.1 | 9.1 | 8.1 |
|  | 1000 | 9.1 | 8.2 | 9.7 | 5.4 |
|  | 1050 | 8.2 | 6.4 | 8.8 | 8.6 |

It is noted from Table 1 that by the present invention, a highly dielectric powder excelling in low-temperature sintering property and possessing highly excellent electric characteristics is obtained.

EXAMPLES 3–6

Powders of compositions aimed at were prepared by following the procedure of Example 1, except that solutions of lead butoxide in varying solvents indicated in Table 2 were used in place of the benzene solution of lead butoxide.

The powders were tested for electric properties. The results were equal to those of Example 1 shown in Table 1 within the range of tolerance of measurement.

TABLE 2

| Example | Solvent |
|---|---|
| 3 | Toluene |
| 4 | Xylene |
| 5 | Benzene-toluene-xylene (40:30:30 mol %) |
| 6 | Benzene-toluene (50:50 mol %) |

EXAMPLES 7 and 8

Powders of compositions aimed at were obtained by following the procedure of Example 1, except that an ethanol solution of strontium ethoxide (Example 7) and a butanol solution of strontium ethoxide (Example 8) were used in place of the iso-propyl alcohol solution of strontium isopropoxide.

The powders were tested for electric properties. The results were equal to those of Example 1 in Table 1 within the range of tolerance of measurement.

EXAMPLES 9 and 10

Powders of compositions aimed at were prepared by following the procedure of Example 1, except that the speed of dropwise addition of the mixed solution of metal alkoxides to the aqueous solution of ammonium para-tungstate was changed from 10 ml/min. to 70 ml/min. (Example 9) and 0.8 ml/min. (Example 10).

The powders were tested for electric properties. The results were equal to those of Example 1 shown in Table 1 within the range of tolerance of measurement.

EXAMPLE 11

A powder of a composition aimed at was prepared by following the procedure of Example 1, except that the heating of the produced precipitate was effected under different conditions of 600° C. and two hours.

The powder was tested for electric properties. The results were equal to those of Example 1 within the range of tolerance of measurement.

EXAMPLE 12

A powder of a composition aimed at was prepared by following the procedure of Example 1, except that the heating of the produced precipitate was effected under different conditions of 800° C. and one hour.

The powder was tested for electric properties. The results were equal to those of Example 1 within the range of tolerance of measurement.

EXAMPLES 13–20

Synthesis of $(Sr_xPb_{1-x}TiO_3)_y(PbMg_{0.5}W_{0.5}O_3)_{1-y}$

Powders of compositions whose values of the subscripts, x and y, in the aforementioned formula were varied as shown in Table 3 were obtained by following the procedure of Example 1, except that the mixing ratio of metal alkoxides and the amount of the aqueous solution of ammonium para-tungstate were varied as indicated.

The powders were tested for electric properties. The results are shown in Table 3.

TABLE 3

| Example No. | Composition x | y | Firing temperature (°C.) | Dielectric constant ($\epsilon$) | Dielectric loss (%) | Specific resistance ($10^{12}\Omega \cdot cm$) |
|---|---|---|---|---|---|---|
| 13 | 0.04 | 0.5 | 950 | 4200 | 2.5 | 6.7 |
| | | | 1000 | 5500 | 1.7 | 9.1 |
| | | | 1050 | 7600 | 0.5 | 7.6 |
| 14 | 0.12 | 0.5 | 950 | 4000 | 1.8 | 8.1 |
| | | | 1000 | 5100 | 1.1 | 8.9 |
| | | | 1050 | 7000 | 0.4 | 8.7 |
| 15 | 0.16 | 0.5 | 950 | 3500 | 0.2 | 9.0 |
| | | | 1000 | 4000 | 0.2 | 9.1 |
| | | | 1050 | 5500 | 0.2 | 8.9 |
| 16 | 0.1 | 0.46 | 950 | 7700 | 2.8 | 8.5 |
| | | | 1000 | 8300 | 2.0 | 7.8 |
| | | | 1050 | 8600 | 0.6 | 6.9 |
| 17 | 0.1 | 0.47 | 950 | 6500 | 2.5 | 8.4 |
| | | | 1000 | 7000 | 2.5 | 7.7 |
| | | | 1050 | 8100 | 0.7 | 7.7 |
| 18 | 0.1 | 0.48 | 950 | 5000 | 2.0 | 8.2 |
| | | | 1000 | 6800 | 1.8 | 9.3 |
| | | | 1050 | 7900 | 0.5 | 8.9 |
| 19 | 0.2 | 0.46 | 950 | 3900 | 0.9 | 6.9 |
| | | | 1000 | 4700 | 0.5 | 7.3 |
| | | | 1050 | 5900 | 0.5 | 8.0 |

TABLE 3-continued

| Example No. | Composition x | y | Firing temperature (°C.) | Dielectric constant ($\epsilon$) | Dielectric loss (%) | Specific resistance ($10^{12}\Omega \cdot cm$) |
|---|---|---|---|---|---|---|
| 20 | 0.2 | 0.47 | 950 | 2900 | 1.2 | 7.1 |
| | | | 1000 | 3800 | 0.6 | 6.8 |
| | | | 1050 | 5000 | 0.6 | 8.0 |

We claim:

1. A method for the production of a highly dielectric powder having the chemical composition represented by the general formula:

$$(PbTiO_3)_y(PbMg_{0.5}W_{0.5}O_3)_{1-y}$$

(wherein $0<y<1$), comprising adding a mixture consisting of lead alkoxide, titanium alkoxide, and magnesium alkoxide to an aqueous solution of ammonium para-tungstate thereby effecting hydrolysis of alkoxides and coprecipitation of a tungsten component and subsequently heating the resulting precipitate to dry.

2. A method according to claim 1, wherein said lead alkoxide, titanium alkoxide, and magnesium alkoxide are mixed as dissolved in an organic solvent.

3. A method according to claim 1, wherein said precipitate is separated by filtration and the separated precipitate is heated.

4. A method according to claim 1, wherein said precipitate is heated at a temperature not lower than 600° C. and lower than the decomposition temperature of the highly dielectric powder.

5. A method according to claim 1, wherein the subscript y in said general formula has a value falling in the range of $0.3<y<0.5$.

6. A method according to claim 1, wherein said alkoxides are alkoxides of a monohydric alcohol.

7. A method according to claim 2, wherein said organic solvent is at least one member selected from the group consisting of benzene, toluene, xylene, iso-propyl alcohol, butanol, methanol, ethanol, and n-propyl alcohol.

8. A method according to claim 2, wherein said alkoxides are dissolved in said organic solvent in a total concentration of 0.1 to 1 mol/liter.

9. A method for the production of a highly dielectric powder having the chemical composition represented by the general formula:

$$(Sr_xPb_{1-x}TiO_3)_y(PbMg_{0.5}W_{0.5}O_3)_{1-y}$$

(wherein $0<x<1$ and $0<y<1$), comprising adding a mixture consisting of strontium alkoxide, lead alkoxide, titanium alkoxide, and magnesium alkoxide to an aqueous solution of ammonium para-tungstate thereby effecting hydrolysis of alkoxides and coprecipitation of tungsten component and subsequently heating the resulting precipitate to dry.

10. A method according to claim 9, wherein said strontium alkoxide, lead alkoxide, titanium alkoxide, and magnesium alkoxide are mixed as dissolved in an organic solvent.

11. A method according to claim 9, wherein said precipitate is separated by filtration and the separated precipitate is heated.

12. A method according to claim 9, wherein said precipitate is heated at a temperature not lower than 600° C. and lower than the decomposition temperature of the highly dielectric powder.

13. A method according to claim 9, wherein said subscripts x and y in said general formula have values falling respectively in the ranges of $0<x<0.15$ and $0.3<y<0.5$.

14. A method according to claim 9, wherein said alkoxides are alkoxides of a monohydric alcohol.

15. A method according to claim 10, wherein said organic solvent is at least one member selected from the group consisting of benzene, toluene, xylene, iso-propyl alcohol, butanol, methanol, ethanol, and n-propyl alcohol.

16. A method according to claim 10, wherein said alkoxides are dissolved in said organic solvent in a total concentration of 0.1 to 1 mol/liter.

* * * * *